United States Patent [19]

Iwasaki et al.

[11] 4,413,091
[45] Nov. 1, 1983

[54] PHOTOSENSITIVE POLYMER AND PHOTOSENSITIVE MATERIAL FOR PHOTOMECHANICAL PROCESS

[75] Inventors: Hidenori Iwasaki, Samukawa; Yukio Urata, Hino; Shunichi Kasukawa, Yamato, all of Japan

[73] Assignee: Tokyo Ohka Kogyo Kabushiki Kaisha, Kawasaki, Japan

[21] Appl. No.: 336,058

[22] Filed: Dec. 31, 1981

[30] Foreign Application Priority Data

Jan. 20, 1981 [JP] Japan ............................ 56-005910

[51] Int. Cl.$^3$ .............................................. C08F 8/30
[52] U.S. Cl. ...................................... 525/61; 430/195
[58] Field of Search .......................................... 525/61

[56] References Cited

U.S. PATENT DOCUMENTS

3,072,485  1/1963  Reynolds et al. .................... 96/115
3,096,311  7/1963  Merrill et al. ...................... 260/78.5

FOREIGN PATENT DOCUMENTS

1138929  1/1969  United Kingdom .

OTHER PUBLICATIONS

G. A. Delzenne and U. Laridon, J. Polymer Sci., Part C, No. 22, pp. 1149–1160 (1969).
G. Nagamatsu et al., Bulletin of the Technical Association of Graphic Arts of Japan, Oversease No. 2, pp. 23–29 (1971).

Primary Examiner—Stanford M. Levin
Attorney, Agent, or Firm—Armstrong, Nikaido, Marmelstein & Kubovcik

[57] ABSTRACT

(1) A polyvinyl alcohol derivative represented by the formula:

(where $R_1$ is a hydrogen atom or an alkyl group, $R_2$ is an aryl group, and k, l, m, and n denote integers of 1 or more.) (2) A photosensitive material for photomechanical process containing a polyvinyl alcohol derivative represented by the formula:

(where $R_1$ is a hydrogen atom or an alkyl group, $R_2$ is an aryl group, and k, l, m, and n denote integers of 1 or more) and a sensitizing agent.

14 Claims, No Drawings

PHOTOSENSITIVE POLYMER AND PHOTOSENSITIVE MATERIAL FOR PHOTOMECHANICAL PROCESS

BACKGROUND OF THE INVENTION

The present invention relates to a photosensitive polymer containing an azide aryl group as the photocrosslinkable sensitive group, and a photosensitive material for photomechanical process which is prepared by incorporating the said photosensitive polymer with a sensitizing agent. The photosensitive material of this invention is particularly useful for planographic printing.

In Japanese Patent Publication Nos. 47-1167 (1972) and 52-7364 (1977) the blend of a condensate of diazonium salt of p-aminodiphenylamine with formaldehyde and a copolymer of acrylate compounds is disclosed. This blend is known as a typical example among negative photosensitive polymers for planographic printing which are in wide use because of their comparatively good stability during prolonged storage. These photosensitive polymers, however, give printing images which have poor acceptability of printing ink, and plates made from them cause a great deal of spoilage at the beginning of printing work. In addition, such plates have printing images which are mechanically too weak to stand a long run. Moreover, such conventional photosensitive polymers need an aqueous alkaline solution for development and after washing with water, the alkaline solution generates, a large quantity of alkaline waste liquid which has to be treated before being discharged from the working area.

Photosensitive polymers based on a polyhydric alcohol ester of unsaturated acid or polycarboxylic acid were proposed in Japanese Patent Publication Nos. 54-37522 (1979) and 48-2042 (1973) to overcome these drawbacks. They, however, are still not satisfactory.

SUMMARY OF THE INVENTION

The object of the present invention is to provide a photosensitive polymer having good developability, good ink receptivity and high mechanical strength and a photosensitive material for a photomechanical process which is prepared by incorporating the said photosensitive polymer with a sensitizing agent.

Further objects of the invention will become obvious to persons skilled in the art from the following description and claims.

According to the present invention, the photosensitive polymer is obtained by hydrolyzing with a mineral acid polyvinyl acetate, preferably polyvinyl acetate having a polymerization degree in the range from about 120 to about 2,200 in an organic solvent and reacting the hydrolyzate with azide aryl aldehyde and aliphatic aldehyde to perform acetalization. The photosensitive material for photomechanical process is prepared by incorporating the said photosensitive polymer with at least one nitro compound or ketone compound as a sensitizing agent. The photosensitive material for photomechanical process may be incorporated with additives such as pigment and stabilizer which are commonly used for photosensitive materials.

DETAILED DESCRIPTION OF PREFERRED EMBODIMENTS OF THE INVENTION

The photosensitive polymer in the present invention is represented by the following formula.

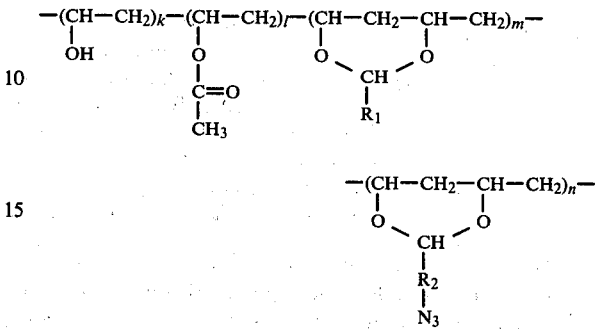

(where $R^1$ is a hydrogen atom or an alkyl group, $R^2$ is an arylene group, and $k$, $l$, $m$, and $n$ denote integers of 1 or more.)

This photosensitive polymer is synthesized as follows: Polyvinyl acetate (having a polymerization degree in the range from about 120 to about 2,200) is dissolved at a concentration of 10 to 20 wt% in an organic solvent such as methanol, and then 0.2 to 0.6 mole of azide aryl aldehyde and 0.05 to 0.4 mole of saturated aliphatic aldehyde based on 1 mole of vinyl monomer in polyvinyl acetate are added while stirring. The solution is then heated to 50° to 60° C. Next, a mixture of a water-miscible organic solvent such as methanol or ethanol and a mineral acid such as hydrochloric acid, sulfuric acid, or phosphoric acid is added. Hydrolysis and acetalization are carried out simultaneously at 50° to 60° C. over a period of 3 to 6 hours.

The azide aryl aldehyde used in the above reaction includes, for instance, o-, m-, or p-azidebenzaldehyde or 1-azide-5-naphthylaldehyde. The aliphatic aldehyde includes, for instance, formaldehyde, acetaldehyde, propyl aldehyde, butyl aldehyde, and nonyl aldehyde. Aryl aldehyde such as hydroxybenzaldehyde and hydroxynaphthylaldehyde having a hydrophilic group may be used on account of their solubility.

The sensitizing agent to be incorporated into the photosensitive material for photomechanical process is a nitro compound or ketone compound. Preferable examples of nitro compounds include 4-nitrodiphenyl, 1-nitronaphthalene, 2-amino-5-nitrotoluene, 2,6-dichloro-4-nitroaniline, 4-nitroacenaphthene, 5-nitroacenaphthene, 3-nitropyrene, 2-nitrofluorene, N-acetyl-4-nitro-1-naphthylamine, and N-acetyl-5-nitro-1-naphthylamine. Preferable examples of ketone compounds include 1,2-benzanthraquinone, 2,3-benzanthraquinone, p,p'-tetramethyldiaminobenzophenone, and 2-methylanthraquinone.

The photosensitive polymer or photosensitive material for photomechanical process as disclosed in this invention may be used to produce planographic printing plates by dissolving it in a solvent such as ethylene glycol monobutyl ether and ethylene glycol monoethyl ether and then coating the solution on a support such as polyester film, chrome-plated metal plate, or aluminum plate. If necessary, the surface of the support may be roughened by mechanical, chemical, or electrochemical means, or the aluminum plate may be anodized or made hydrophilic.

The photosensitive polymer or photosensitive material for photomechanical process as disclosed in this invention may be used to prepare a photosensitive solution by dissolving it in a solvent such as ethylene glycol monobutyl ether or ethylene glycol monoethyl ether. If necessary, dye, pigment, stabilizer, sensitizing agent, etc. may be added.

It should be noted that the hydrolysis of polyvinyl acetate with a mineral acid and acetalization are carried out simultaneously in order to accomplish smooth and reproducible reactions. If saponified polyvinyl acetate or polyvinyl alcohol is used as a starting material for the acetalization, the hydroxyl group in the polyvinyl alcohol decreases, with a resulting variation of solubility in solvents. It is thus very difficult to accomplish reproducible reactions.

The polyvinyl acetate used as a starting material in this invention should have a polymerization degree in the range from about 120 to about 2,200, preferably about 500 to about 1,000, for good developability and good adhesion of the coating to the support.

Since the saturated aliphatic acetal group is introduced into the side chains, the photosensitive polymer of this invention is improved in mechanical strength, adhesion to aluminum plate for planographic printing, miscibility with organic solvents, development performance, and coatability. In addition, planographic printing plates made of the photosensitive polymer of this invention are improved in ink receptivity at the beginning of printing, with a resulting decrease of spoilage.

If the aliphatic acetal group in the reaction product is less than 5 mol% in the synthesis of the photosensitive polymer, the above-mentioned improvements cannot be achieved; if it is more than 40 mol%, the photosensitivity decreases to an impractical level.

In addition, if the azide aryl group is less than 5 mol%, the resulting polymer decreases in photosensitivity, and the use of more than 35 mol% is economically disadvantageous. If the acetyl group exceeds 45 mol%, the resulting polymer decreases in photosensitivity and loses the advantage of introducing the aliphatic acetal group. If the hydroxyl group exceeds 60 mol%, the resulting polymer decreases in solubility for solvents and is poor in developing performance.

The photosensitive polymer of the present invention has the highest photosensitivity and the best stability in development when the functional groups are in the following ranges.

| Aliphatic acetal group | 5 to 40 mol % |
| --- | --- |
| Azide aryl group | 5 to 35 mol % |
| Acetyl group | 1 to 45 mol % |
| Hydroxyl group | 1 to 60 mol % |

The sensitizing agents used in this invention were evaluated for effectiveness by comparing their sensitivity when included in the photosensitive polymer at 10 wt% and irradiated by a 2 kW super high pressure mercury lamp at a distance of 1 meter. The results are shown in Table 1.

TABLE 1

| Sensitizing agent | Irradiation time (min) | Step wedge test* |
| --- | --- | --- |
| None | 1.5 | 9 |
| Michler's ketone | 0.5 | 10 |
| 5-nitroacenaphthene | 0.5 | 13 |
| 1,2-benzanthraquinone | 0.5 | 13 |

*Expressed by the number of steps remaining unexposed when the sensitivity was tested with Kodak Photographic Step Tablet No. 2 (21 steps).

The invention is illustrated by the following monlimiting examples.

EXAMPLE 1

A photosensitive polymer was prepared as follows: Ninety-seven grams of p-azide benzaldehyde was added to 1,510 g of 15% methanol solution of polyvinyl acetate (Gosenyl M50-Z8, made by Nippon Gosei Kagaku Kogyo Co.) while stirring. After raising the reaction temperature to 55° C., 48 g of n-butylaldehyde was added and then a mixture of 63 ml of conc. hydrochloric acid and 216 ml of methanol was slowly added. The reactants were allowed to react at 55° C. until the reactants became turbid at 2 hours. Stirring was continued for another 3 hours to accomplish acetalization. After cooling, the supernatant liquid of the resulting liquid was discarded and the separated polymer precipitates were washed with 900 ml of methanol, and then dissolved in 250 ml of acetone. The acetone solution was added slowly to 1,000 ml of methanol to separate the polymer. The polymer was then washed with water and dried. Elementary analysis and a test conforming to JIS K 6728 gave the following analytical results.

| Residual hydroxyl group | 29.13% |
| --- | --- |
| Butyral group | 30.12% |
| Residual acetate group | 25.93% |
| p-Azide benzal group | 14.81% |

This photosensitive polymer was used to prepare a photosensitive solution of the following composition.

| Polymer | 10 g |
| --- | --- |
| 1,2-benzanthraquinone | 1 g |
| Ethylene glycol monobutyl ether | 100 g |
| Phthalocyanine blue S-10 (C.I. 74160) | 0.2 g |

(a product by Dainichiseika Color & Chemicals MFG. Co., Ltd.)

The photosensitive solution was applied to a mechanically grained and anodized planographic printing plate, at a coating weight as dried of 1 g/m² by using a roll coater, followed by drying by a far infrared heater. With a negative film closely attached by vacuum, the photosensitive printing plate was exposed for 30 seconds to a super high pressure mercury lamp placed 1 meter away. The exposed plate was then subjected to wipe-on development for one minute with a developing solution of the following composition.

| Ethylene glycol monobutyl ether | 330 g |
| --- | --- |
| Benzyl alcohol | 165 g |
| Phosphoric acid | 33 g |

A clear image faithful to the negative film was obtained. The resulting plate was set on an offset rotary press and the press was run at a speed of 22,000 copies per hour. The printing image on the plate picked up ink immediately, and 120,000 copies were printed without trouble from the plate. For the purpose of comparison, printing was also performed with a presensitized plate typified by diazo type photosensitive resin. Because of poor ink receptivity at the beginning of printing, spoilage was 200 sheets, compared to 40 sheets in printing with the plate of this invention.

EXAMPLE 2

A photosensitive polymer was prepared as follows: One hundred and fifty-one grams of p-azide benzaldehyde was added to 1,510 g of 15% methanol solution of polyvinyl acetate (Gosenyl M50-Z5, made by Nippon Gosei Kagaku Kogyo Co.) while stirring. After raising the reaction temperature to 55° C., 41 g of paraldehyde was added and then a mixture of 25 ml of 18 N sulfuric acid and 216 ml of methanol was slowly added. The reactants were allowed to react at 55° C. until the reactants became turbid at 2 hours. Stirring was continued for another 2 hours to accomplish acetalization. After cooling, the supernatant liquid was discarded and the separated polymer precipitates were washed with 900 ml of methanol, and then dissolved in 400 ml of acetone. The acetone solution was added slowly to 1.5 liters of methanol to separate the polymer. The polymer was then washed with water and dried. Nitrogen analysis and a test conforming to JIS K 6728 gave the following analytical results.

| Residual hydroxyl group | 30.41 mol % |
| --- | --- |
| Residual acetyl group | 27.19 mol % |
| Formal group | 20.44 mol % |
| p-Azide benzal group | 21.95 mol % |

This photosensitive polymer was used to prepare a photosensitive solution of the following composition.

| Polymer | 3 g |
| --- | --- |
| 1,2-Benzanthraquinone | 0.2 g |
| 5-Nitroacenaphthene | 0.1 g |
| Ethylene glycol monoethyl ether | 70 g |
| Phthalocyanine blue S-10 (C.I. 74160) | 0.24 g |

As in Example 1, a photosensitive printing plate was prepared from this photosensitive solution. Exposure and development were carried out under the same conditions as in Example 1. A clear image faithful to the original was reproduced. The resulting plate was set on an offset press ("Commander", made by Hamada Printing Machine Co.) and the press was run at a speed of 110,000 copies per hour to print 200,000 copies. No trouble was encountered in either the image area or non-image area. Ink reception was good, and the plate was proven to be suitable for long run printing. For the purpose of comparison, printing was also performed with a presensitized plate typified by diazo type photosensitive resin. Trouble in ink acceptability occurred when 120,000 copies had been printed and it was impossible to continue printing.

EXAMPLE 3

As in Example 1, a photosensitive polymer was prepared by reacting 1,510 g of 15% methanol solution of polyvinyl acetate (Gosenyl M50-Z8, made by Nippon Gosei Kagaku Kogyo Co.), 204 g of 1-azide-5-formyl-naphtalene, and 44 g of n-butyl aldehyde. Nitrogen analysis and a test conforming to JIS K 6728 gave the following analytical results.

| Residual hydroxyl group | 31.11 mol % |
| --- | --- |
| Residual acetate group | 24.50 mol % |
| Butyral group | 20.98 mol % |
| p-Azide benzal group | 23.40 mol % |

As in Example 1, this photosensitive polymer was used to produce a photosensitive printing plate, which was exposed under the same conditions as in Example 1 and developed with a developing solution of the following composition.

| γ-Butyrolactone | 700 g |
| --- | --- |
| Propylene glycol | 278 g |
| Phosphoric acid | 22 g |

A clear image faithful to the original was reproduced. The resulting plate was set on an offset rotary press ("Jupiter", made by Tokyo Kikai Co.) and the press was run at a speed of 90,000 copies per hour to print 300,000 copies in color. No trouble was encountered in either the image area or non-image area. Ink reception was good, and the plate was proven to be suitable for long run printing. For the purpose of comparison, printing was also performed with a presensitized plate typified by diazo type photosensitive resin. Trouble in ink acceptability occurred when 130,000 copies had been printed and it was impossible to continue printing.

EXAMPLE 4

0.2 g of Phthalocyanine blue S-10 (C.I. 74160) used as a dye and 3 to 15% (based on the photosensitive polymer) of one of the following sensitizing agents, 2-nitrofluorene, 5-nitroacenaphthene, 1,2-benzanthraquinone, p-dimethylaminobenzophenone, or p,p'-tetramethyldiaminobenzophenone, were added to 10 g of the photosensitive polymer obtained in Example 1. The resulting mixture was dissolved in 100 g of ethylene glycol monoethyl ether to prepare a photosensitive solution. This solution was applied to a mechanically grained and anodized aluminum plate at a coating weight as dried of 2 g/m² by using a roll coater, followed by drying by a far infrared heater. With a negative film closely attached by vacuum, the planographic printing plate was exposed for 30 seconds to a 2 kW super high pressure mercury lamp placed 1 meter away. The exposed plate was then subjected to wipe-on development for one minute with a developing solution of the following composition.

| Ethylene glycol monobutyl ether | 330 g |
| --- | --- |
| Benzyl alcohol | 165 g |
| Phosphoric acid | 33 g |

The specific photosensitivity was measured by the number of steps on a gray scale (0.15 density step) remaining unexposed on the plate.

| Sensitizing agent | Q'ty/Polymer | Specific Sensitivity |
| --- | --- | --- |
| None | 0 wt % | 2 |
| 2-Nitrofluorene | 10 wt % | 6 |
| 5-Nitroacenaphthene | 7 wt % | 8 |
| 1,2-Benzanthraquinone | 10 wt % | 11 |
| p-Dimenthylamino-benzophenone | 7 wt % | 8 |
| p,p'-Tetramethyldiamino- | 7 wt % | 8 |

| Sensitizing agent | Q'ty/Polymer | Specific Sensitivity |
|---|---|---|
| benzophenone | | 5 |

These results indicate the remarkable sensitizing effect of nitro compounds and ketone compounds.

Comparative Example

A photosensitive polymer was prepared as follows: Seventy grams of p-azide benzaldehyde was added to 1,050 g of 15% methanol solution of polyvinyl acetate (Gosenyl M50-Z8, made by Nippon Gosei Kagaku Kogyo Co.) while stirring. After raising the reaction temperature to 55° C., a mixture of 30 ml of conc. hydrochloric acid and 79 ml of methanol was slowly added, without adding aliphatic aldehyde. The reactants were allowed to react at 55° to 60° C. until the reactants became turbid at 3.2 hours. Stirring was continued for another 3 hours to accomplish acetalization. After cooling, the supernatant liquid was discarded and the separated polymer precipitates were washed with 900 ml of methanol, and then dissolved in 250 ml of acetone. The acetone solution was slowly added to 1,000 ml of methanol to separate the polymer. The polymer was then washed and dried.

This photosensitive layer was used to prepare a photosensitive solution of the following composition.

| Polymer | 10 g |
|---|---|
| 1,2-Benzanthraquinone | 1 g |
| Ethylene glycol monoethyl ether | 100 g |
| Phthalocyanine blue S-10 (C.I. 74160) | 0.2 g |

The photosensitive solution was applied as in Example 1 and exposed and developed. It was found that adhesion to the support was so poor and the coating had swelled so much during development that it was impossible to perform wipe-on development. The photosensitive solution was also very low in specific photosensitivity and was not usable for making planographic printing plates.

What is claimed is:

1. A polyvinyl alcohol derivative characterized as being a solid at ambient temperature and composed of a recurring structural unit comprising
   (a) from 5 to 40% by mole of a structural unit represented by the general formula

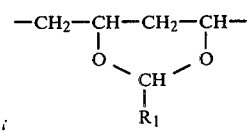

in which $R_1$ is a hydrogen atom or an alkyl group;
   (b) from 5 to 35% by mole of a structural unit represented by the general formula

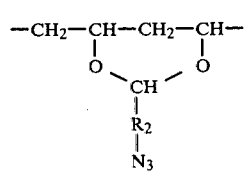

in which $R_2$ is an aryl group;
   (c) from 1 to 45% by mole of a structural unit represented by the formula

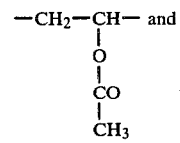

and
   (d) from 1 to 60% by mole of a structural unit represented by the formula

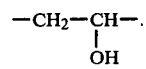

2. A polyvinyl alcohol derivative as set forth in claim 1, in which the degree of polymerization is in the range from about 120 to about 2,200.

3. A polyvinyl alcohol derivative as set forth in claim 1, in which the degree of polymerization is in the range from about 500 to about 1,000.

4. A polyvinyl alcohol derivative as set forth in any one of claims 1, 2 or 3, in which the $N_3$-$R_2$-group is a member selected from the group consisting of an o-azide phenyl group, a m-azide phenyl group, a p-azide phenyl group, a 1-azide-5-naphthyl group, and hydroxy substitutes thereof.

5. A polyvinyl alcohol derivative as set forth in any one of claims 1, 2 or 3 in which the $R_1$-group is selected from the group consisting of a hydrogen atom, a methyl group, a propyl group, a butyl group, and a nonyl group.

6. A process for producing a polyvinyl alcohol derivative characterized as being a solid at ambient temperature and composed of a recurring structural unit comprising
   (a) from 5 to 40% by mole of a structural unit represented by the general formula

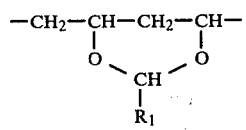

in which $R_1$ is a hydrogen atom or an alkyl group;
   (b) from 5 to 35% by mole of a structural unit represented by the general formula

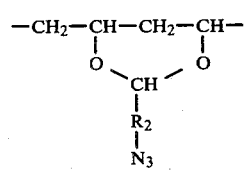

in which $R_2$ is an aryl group;
   (c) from 1 to 45% by mole of a structural unit represented by the formula